UNITED STATES PATENT OFFICE.

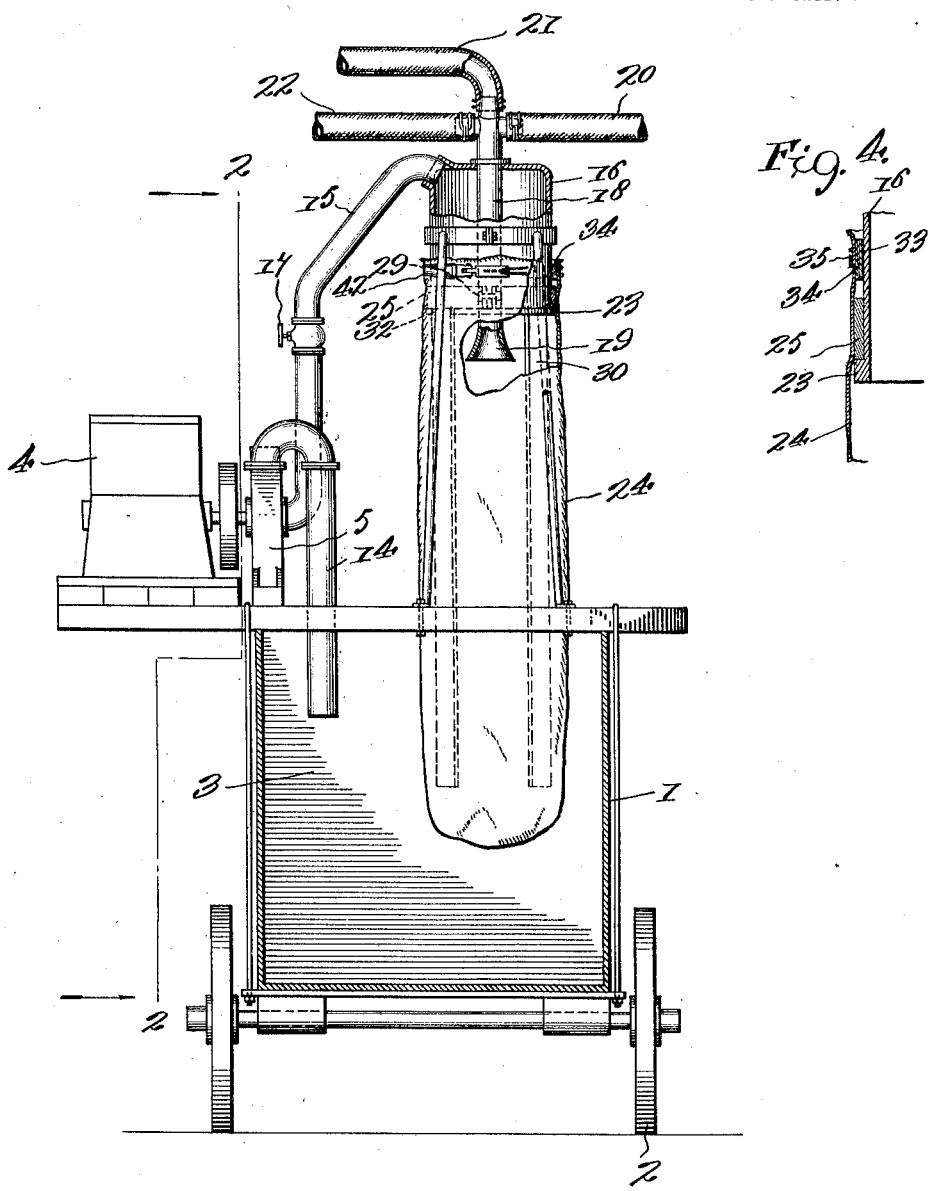

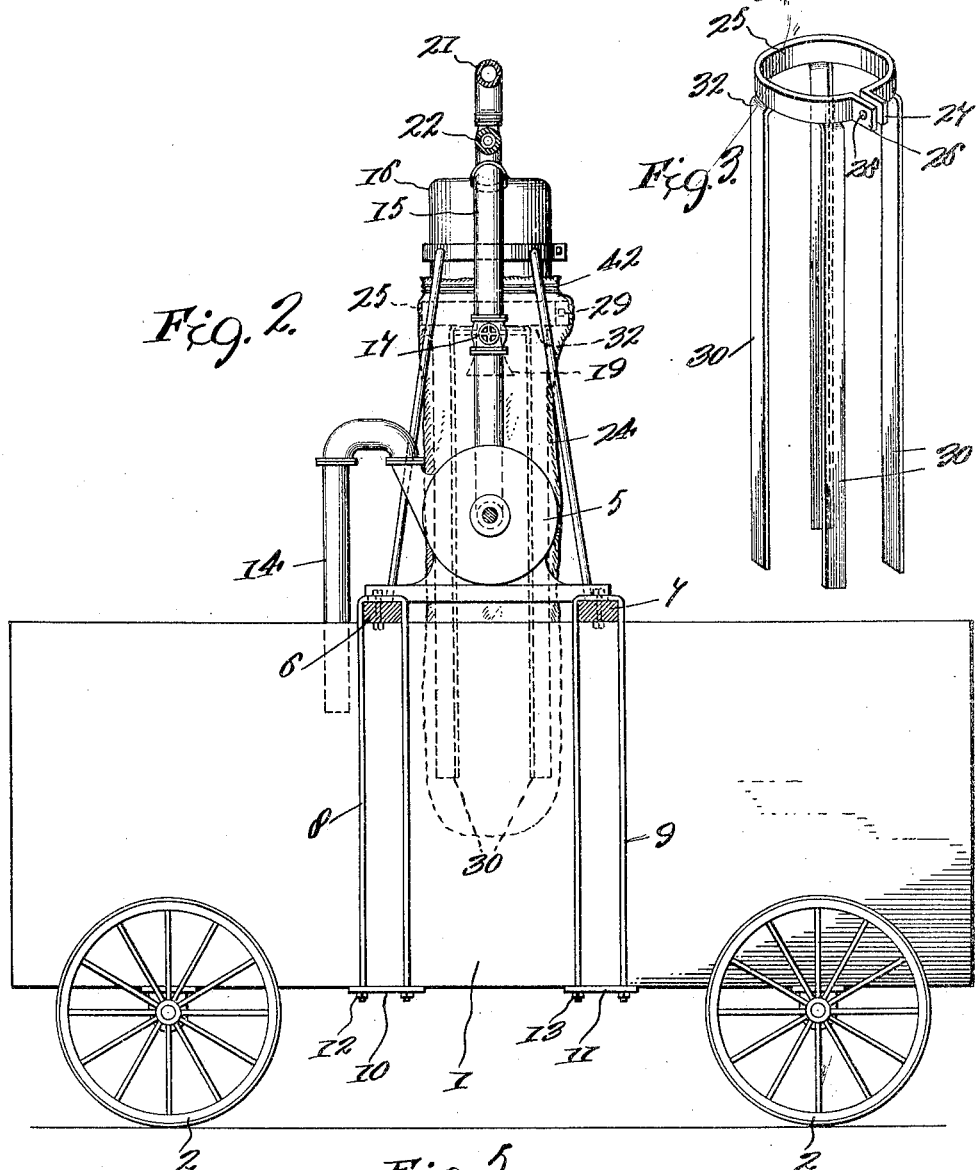

BAILEY E. CHANEY, OF CORPUS CHRISTI, TEXAS.

SACK ATTACHMENT FOR COTTON-PICKING MACHINES.

1,321,715. Specification of Letters Patent. Patented Nov. 11, 1919.

Application filed February 7, 1918. Serial No. 215,817.

*To all whom it may concern:*

Be it known that I, BAILEY E. CHANEY, a citizen of the United States, residing at Corpus Christi, in the county of Nueces and State of Texas, have invented certain new and useful Improvements in Sack Attachments for Cotton-Picking Machines; and I do hereby declare the following to be a full, clear, and exact description of the invention, such as will enable others skilled in the art to which it appertains to make and use the same.

The present invention relates to improvements in cotton picking machines of that type in which a suction is employed to draw in through picking tubes to a receiver, the cotton from the plants; and the present invention has more particularly for an object to provide an improved receptacle for the cotton, which consists in a flexible waterproofed sack having means to hold it in position on the machine and stays for preventing the walls of the sack from collapsing, due to the influence of the suction.

In the accompanying drawings forming a part of this application, and in which similar reference symbols indicate corresponding parts in the several views:

Figure 1 is a cross sectional view through a wagon showing in elevation, an improved cotton picking machine thereon, constructed in accordance with my present invention, and with parts shown in section.

Fig. 2 is a sectional view taken on the line 2—2 in Fig. 1.

Fig. 3 is a perspective view of the improved sack supporting device.

Fig. 4 is a fragmentary vertical sectional view on an enlarged scale of the receiver showing one manner of attaching the sack; and Fig. 5 is a fragmentary perspective view of the attaching means for the sack.

Referring more particularly to the drawings, 1 designates a vehicle or wagon box mounted for movement on the wheels 2, and having a space 3 therein for receiving cotton.

A motor 4 and a suction-producing fan driven thereby, are installed on cross sills 6 and 7, which form a portable platform removably placed on either the wagon box 1 or the bed of any vehicle.

U-bolts 8 and 9 engage the ends of the sills 6 and 7, which project beyond the sides of the wagon box 1 and pass down near such sides to the bottom of the wagon box, where their threaded ends are received through openings in sills 10 and 11 to which they are firmly attached by the nuts 12 and 13 threaded thereon. By removing the nuts 12 and 13 from the threaded ends of the U-bolts 8 and 9, the platform carrying the cotton picking machine, which is installed as a unit, may be quickly removed and the vehicle employed in other uses.

At 14 is shown a discharge leading from the suction-producing device 5 to the cotton space 3 in the wagon box 1, and 15 represents a pipe setting up communication between the eye of the fan 5 and the upper part of a receiver 16; which receiver 16 is supported in any suitable manner from the sills 6 and 7, one means being shown in the drawings, but as this forms no particular part of my present invention, and as it is believed clear as shown, a minute description of same is not though necessary. There is a valve 17 included in the pipe 15 for the purpose of regulating the amount of the suction.

A pipe 18 projects down through the center of the top of the receiver 16 and terminates in a flaring mouth 19 a considerable distance below the end of the pipe 15. This pipe 18 also extends above the top 16, where it is formed with several branches which admit of attaching thereto one or more picking tubes 20, 21 and 22.

The lower end of the receiver 16 is left open and provided with a flange 23 projecting outwardly therefrom. A cotton receiving sack 24, preferably of flexible and water-proof material, has its open end or mouth fitted over the lower open end of the receiver 16 and flange 23 in the manner indicated in Figs. 1 and 2.

A metallic band 25 surrounds the lower end of the receiver 16 and may rest for support and to prevent its accidental detachment from such receiver on the flange 23. For convenience in attaching and detaching, the band 25 is preferably split, which admits of its being opened out to a condition wherein it may be readily applied to or removed from the receiver 16. The ends of the band 25 are turned outwardly to provide ears 26 and 27, which are perforated as indicated at 28 in Fig. 3, whereby to receive a bolt 29 through which the band may be contracted and held in the contracted condition about the receiver 16.

This bolt is of such a character, and its attachment to the ears 27 and 28 is such that it may be readily withdrawn at any time to permit removal of the band 25.

A suitable number of stays 30, stamped or otherwise produced preferably from the same integral piece of metal from which the band 25 is made, extend down at right angles from said band 25 and on the interior of the sack 24; such stays acting to hold the bag 24 distended and preventing its collapse which would otherwise result from the influence of the suction. As shown at 32 in Fig. 3, these stays 30 are bent or offset adjacent the band 25 in order to pass about the flange 23 at the open bottom of the receiver 16.

The flexible sack 24 may be held on the receiver 16 in any suitable manner, but I preferably provide the means shown in the drawing in order to facilitate attachment and detachment thereof. This means involves first applying a coating of glue 33, or other adherent substance, about a suitable area on the exterior of the receiver 16 above the band 25, and in thereafter winding a strip of cotton cloth 34 an appropriate number of times about such glued area in order to form a yielding support for the mouth of the sack 24. The mouth of the sack 24 is brought up about the stays 30, band 25, and lower part of the receiver 16 until it arrives at a position about the yielding support afforded by the cotton cloth; and it is tightly held to such support, forming an air excluding joint therewith by the device shown more particularly in Fig. 5.

In Fig. 5 a band 35 is shown provided with a series of hooks 36 and with a perforated tongue 37 also formed with a hook 38. A coupling piece 39 is bifurcated to receive the tongue 37, and a bolt 40 is adapted to connect these parts. At 41 I have shown a hook on the end of the coupling piece 39. The band 35 is shown curved to conform to the curvature of the receptacle 16, and is fitted on the outside of the sack mouth in substantially the manner shown in Fig. 1, where it is held by a wire loop 42 having one end engaged with the hook 41 and its other end attached to one of the hooks 36. By employing a plurality of such hooks 36 the device is adjustable to fit sacks made of either light or heavy goods or to be used in connection with receivers of different diameters. The object is to draw the band 35 and wire loop 42 tightly about the sack mouth so that these parts will embed themselves to some degree in the yielding support and will effectually exclude air.

The operation of my present invention is substantially as follows:

The vehicle 1 is propelled along either by draft animals or self-contained power through the cotton field; while the cotton pickers walk with the picking tubes 20, 21 and 22 and apply them to the cotton bolls. When thus applied the cotton is placed under the influence of the suction created by the device 5, and is drawn from the plant through the picking tube to the pipe 18, which enters through the receiver 16. The suction also draws the cotton through this pipe 18 and discharges it to the bell-shaped or flaring mouth 19, whereupon it will fall into the flexible sack 24 which forms, in effect, a trap in the suction circuit. The inrushing air which accompanies the cotton and draws it into the sack 24 being lighter than the cotton will, under the influence of the suction, pass to the upper part of the receiver 16 and into the pipe 15 to the eye of the fan 5, after circulating through which it will be ejected into the atmosphere again through the discharge pipe 14.

The action of the suction fan 5 constantly tends to create a partial vacuum in the receiver 16 and sack 24, such as would collapse the walls of the sack and prevent it from receiving the incoming cotton, were it not for the provision of the stays 30 which pass down on the interior of such sack and constitute a rigid means for holding the walls distended against the atmospheric pressure.

When the sack 24 is filled to capacity with the cotton, it may be removed by disengaging therefrom its supporting device. The bag mouth can then be tied, and the bag forms a convenient means for transporting the cotton to the gin, or other desired destination; or, after the bag has become filled, the picking tubes 20, 21 and 22 may be closed from communication to the atmosphere by valves which they ordinarily carry and the valve 17 in the pipe 15 may, if desirable, be opened wider, so that the suction will be centered on the contents of the sack 24 and will operate to draw the cotton therefrom up through the receiver 16, pipe 15, to the fan 5 and thence through the pipe 14 to the cotton receiving space 3 in the wagon body 1. Of course the wagon body 1 is of a capacity several times greater than that of the sack 24, and therefore discharging its contents into the wagon box 1 may be repeated many times before the wagon must be unloaded.

It is obvious that those skilled in the art may vary the details of construction and arrangements of parts without departing from the spirit of my invention, and therefore I do not wish to be limited to such features except as may be required by the claims.

I claim:

1. The combination of a suction circuit including a receiver, of a flexible non-porous bag forming a trap in said circuit, means for securing the mouth of the bag about the receiver and forming an air-tight joint thereat, and means extending down into the bag to prevent the collapse of the bag under the influence of the suction, substantially as described.

2. A device of the character described including a suction receiver, an air-tight sack having its mouth arranged about said receiver, means passing about said sack for tightly clamping the mouth thereof about said receiver to form an air-tight joint therebetween, and spaced stays carried by said receiver and extending down into said sack to hold the sack distended in opposition to the suction produced in said receiver, substantially as described.

3. In combination with a suction receiver having a lower open end with a flange extending thereabout, an air-tight sack having its mouth fitted about the lower end of said receiver, means whereby the sack mouth may be supported on the receiver and whereby an air-tight joint may be made therewith, a band supported by said flange, and stays extending from said band down within the sack and adapted to prevent the collapse of the sack under the influence of the suction, substantially as described.

4. In combination with a suction receiver having a lower open end provided with an external flange thereabout, a non-porous sack having its mouth up about the lower end of said receiver, means whereby the sack mouth may be bound about said receiver and an air-tight joint formed therebetween, an expansible band supported on said flange, means to hold said band contracted about the receiver, and stays extending from said band down within the sack to hold the walls of the latter distended in opposition to the action of the suction, substantially as described.

5. In combination with a suction receiver having a lower open end, a non-porous sack having its mouth brought up about the lower end of said suction receiver, a band of soft material on said receiver, means passing about the sack and said band of soft material to bind the sack mouth tightly thereagainst to form an air-tight joint, and means supported from said receiver and extending down within the sack to prevent the collapse of the latter under the influence of the suction, substantially as described.

6. In combination with a suction receiver having a lower open end, a band of soft material surrounding said receiver, a sack having its mouth brought up about said receiver and said band of soft material, means passing about said bag mouth and band of soft material to embed the former in the latter whereby to form an air-tight joint therebetween, said means including a metallic band having a series of hooks thereon, a coupling piece connected to said band, and a wire loop connected between said coupling piece and one of the hooks on said band, and means entering within the sack for preventing the collapse of the sack due to the suction, substantially as described.

7. In combination with a suction receiver having an open lower end, a band of soft material passing about said suction receiver, a bag having its mouth brought up about said band of soft material, a wire loop passing about said sack mouth and band of soft material to bind the same together whereby to form an air-tight joint, a coupling piece having a hook engaged by one end of said wire loop, an arcuate band having a series of hooks, one hook being engaged by the other end of said wire loop, means for connecting said arcuate band and coupling piece, a split ring adapted to fit about the lower end of said receiver, means for securing the divided ends of said split ring removably together, and stays extending from said split ring and passing within said sack whereby to hold the sack against collapse due to the suction, substantially as described.

In testimony whereof, I affix my signature.

BAILEY E. CHANEY.

Copies of this patent may be obtained for five cents each, by addressing the "Commissioner of Patents, Washington, D. C."